(12) United States Patent
Elliott (10) Patent No.: US 9,160,497 B2
(45) Date of Patent: Oct. 13, 2015

(54) APPLICATION CONTINUITY WITH REROUTE AND RESET IN A WIRELESS COMMUNICATION NETWORK

(75) Inventor: Brent J. Elliott, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 110 days.

(21) Appl. No.: 13/592,042

(22) Filed: Aug. 22, 2012

(65) Prior Publication Data

US 2014/0003358 A1  Jan. 2, 2014

Related U.S. Application Data

(60) Provisional application No. 61/667,325, filed on Jul. 2, 2012.

(51) Int. Cl.
*H04W 36/00* (2009.01)
*H04L 1/18* (2006.01)
(Continued)

(52) U.S. Cl.
CPC ............ *H04L 1/1861* (2013.01); *H04L 1/1812* (2013.01); *H04L 5/0053* (2013.01); *H04L 5/0055* (2013.01); *H04L 5/0073* (2013.01); *H04L 5/14* (2013.01); *H04W 4/005* (2013.01); *H04W 24/10* (2013.01); *H04W 28/08* (2013.01); *H04W 36/22* (2013.01); *H04W 48/12* (2013.01); *H04W 52/0206* (2013.01); *H04W 52/0212* (2013.01); *H04W 52/0245* (2013.01);
(Continued)

(58) Field of Classification Search
CPC ..... H04L 12/5689; H04L 12/56; H04L 12/70; H04L 2012/562; H04L 45/02; H04L 45/10; H04L 45/14; H04L 45/22; H04L 45/54; H04L 45/56; H04L 45/28; H04L 61/00; H04L 63/327; H04L 67/1074; H04M 7/00
USPC ............ 370/230, 331, 338, 389–392, 395.52; 455/404.1, 418, 455
See application file for complete search history.

(56) References Cited

U.S. PATENT DOCUMENTS 6,631,122 B1  10/2003  Arunachalam et al.
7,599,365 B1 *  10/2009  Sabol et al. .................... 370/389
(Continued)

OTHER PUBLICATIONS

International Search Report and Written Opinion mailed Nov. 1, 2013 from International Application No. PCT/US2013/047358.
(Continued)

*Primary Examiner* — Charles C Jiang
*Assistant Examiner* — Mohamed Kamara
(74) *Attorney, Agent, or Firm* — Schwabe, Williamson & Wyatt, P.C.

(57) ABSTRACT

In embodiments, a user equipment (UE) may include an applications module and a communications module. The applications module may run an application and facilitate communications between the application and a remote server over a wireless communication network. The communications between the application and the remote server may initially be over a first interface selected based on a route table. The communications module may identify a second interface that is preferred to the first interface. The communications module may modify the route table to prioritize the second interface over the first interface. Additionally, the communications module may instruct the applications module to execute a reset operation to re-establish communications between the application and the remote server using the second interface.

26 Claims, 5 Drawing Sheets

(51) Int. Cl.
*H04W 28/08* (2009.01)
*H04W 24/10* (2009.01)
*H04W 72/04* (2009.01)
*H04W 52/02* (2009.01)
*H04W 72/00* (2009.01)
*H04W 92/02* (2009.01)
*H04L 5/00* (2006.01)
*H04W 4/00* (2009.01)
*H04W 36/22* (2009.01)
*H04L 5/14* (2006.01)
*H04W 48/12* (2009.01)
*H04W 68/00* (2009.01)
*H04W 88/08* (2009.01)

(52) U.S. Cl.
CPC ............ *H04W68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04W 88/08* (2013.01); *Y02B 60/50* (2013.01); *Y02E 40/62* (2013.01)

(56) References Cited

U.S. PATENT DOCUMENTS

| | | | |
|---|---|---|---|
| 7,613,120 | B2 | 11/2009 | Devereux et al. |
| 7,664,119 | B2 | 2/2010 | Adams et al. |
| 8,260,348 | B2 | 9/2012 | Sherman |
| 8,446,916 | B2* | 5/2013 | Aybay et al. .................. 370/412 |
| 2005/0198384 | A1* | 9/2005 | Ansari et al. .................. 709/245 |
| 2006/0013248 | A1* | 1/2006 | Mujeeb et al. ................ 370/463 |
| 2006/0084417 | A1* | 4/2006 | Melpignano et al. ......... 455/418 |
| 2006/0259951 | A1* | 11/2006 | Forssell et al. .................... 726/1 |
| 2007/0030826 | A1* | 2/2007 | Zhang et al. ................. 370/331 |
| 2008/0025273 | A1* | 1/2008 | Sano ............................ 370/338 |
| 2008/0101318 | A1* | 5/2008 | Taaghol et al. ............... 370/342 |
| 2008/0207161 | A1* | 8/2008 | Upp et al. .................. 455/404.1 |
| 2010/0110882 | A1* | 5/2010 | Murugan ...................... 370/225 |
| 2012/0173918 | A1* | 7/2012 | Olson et al. ...................... 714/3 |
| 2012/0320924 | A1* | 12/2012 | Baliga et al. ................. 370/400 |

OTHER PUBLICATIONS

Gahng-Seop Ahn et al., "SWAN: Service Differentiation in Stateless Wireless Ad Hoc Networks," INFOCOM 2002, 10 pages.
International Preliminary Report on Patentability for International Application No. PCT/US2013/047358, mailed on Jan. 15, 2015.

* cited by examiner

APPLICATION CONTINUITY WITH REROUTE AND RESET IN A WIRELESS COMMUNICATION NETWORK

CROSS REFERENCE TO RELATED APPLICATIONS

The present application claims priority to U.S. Provisional Patent Application No. 61/667,325, filed Jul. 2, 2012, entitled "ADVANCED WIRELESS COMMUNICATION SYSTEMS AND TECHNIQUES," the entire disclosure of which is hereby incorporated by reference.

FIELD

Embodiments of the present invention relate generally to the field of communications, and more particularly, to migrating network flows for applications between wireless communication interfaces.

BACKGROUND

Wireless communication devices may be capable of communicating with a remote server over a wireless communication network using a plurality of interfaces. For example, the wireless communication device may be capable of using interfaces that follow with different protocols, such as a cellular interface and a wireless local area network (WLAN) interface, to communicate with the remote server. The wireless communication device may run one or more applications that establish network flows with the remote server over the wireless communication network. However, the most optimal interface may not be used for the network flows. Further, once a network flow is established on one interface, it may be unable to transition to a more optimal interface as one becomes available.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for measuring the quality of available interfaces, influencing the interface preferred by individual network flows, and migrating network flows between wireless communication interfaces.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
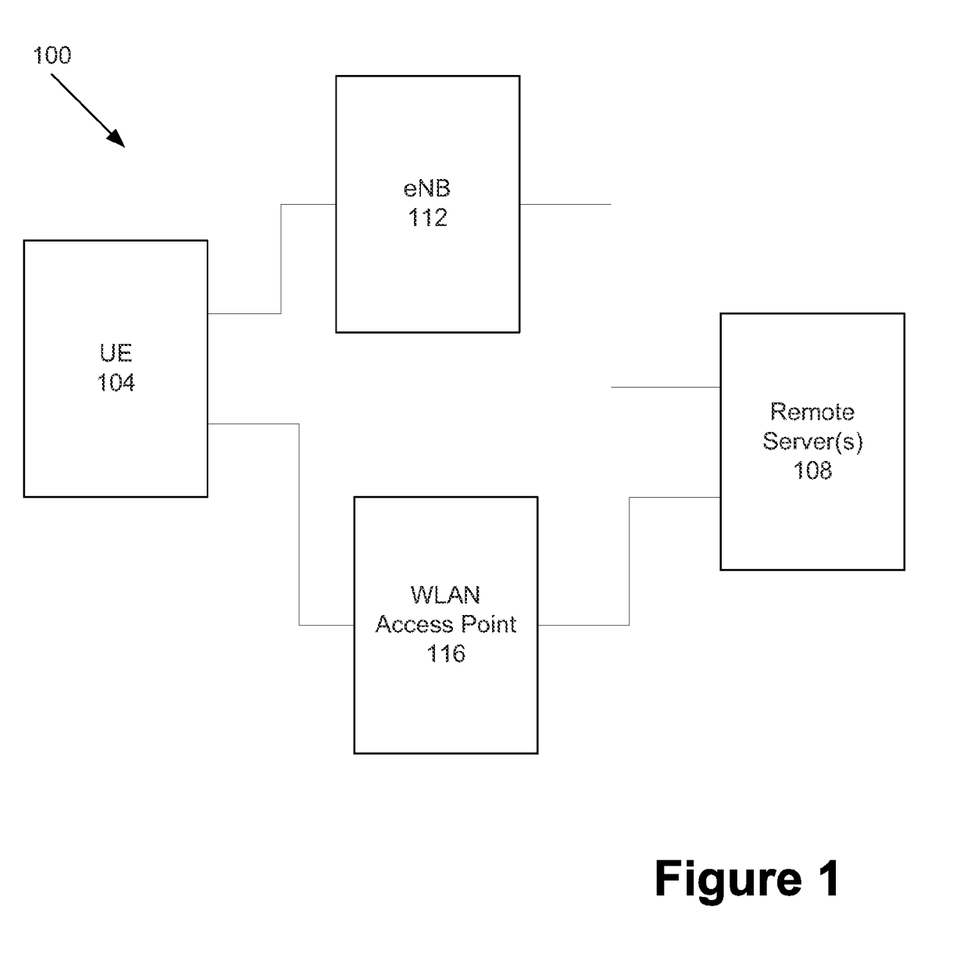
FIG. 1 is a block diagram illustrating wireless communication network in accordance with various embodiments.

FIG. 1 schematically illustrates a wireless communication network 100 in accordance with various embodiments. The wireless communication network (hereinafter "network 100") may include a UE 104 configured to communicate wirelessly with a remote server 116. The network 100 may include a plurality of interfaces through which the UE 104 may communicate with the remote server 116. Different interfaces may be available for use by the UE 104 at different times and/or locations.

The interfaces may have different properties, such as different communication protocols and/or other properties. For example, the UE 104 may be able to access the remote server 116 via a cellular interface and/or a wireless local area network (WLAN) interface. The cellular interface may be routed through a base station, such as an evolved Node B (eNB) 112. The eNB 112 may be a base station of a 3rd Generation Partnership Project (3GPP) long-term evolution (LTE) network such as an evolved universal mobile telecommunication system (UMTS) terrestrial radio access network (E-UTRAN). The WLAN interface may be routed through a WLAN access point 116. WLAN access point 116 may be an access point of an Institute of Electrical and Electronics Engineers (IEEE) 802.11 WLAN network. The network may include other components (not shown) between the UE 104 and remote server 108 to facilitate the cellular interface and/or WLAN interface.

Although FIG. 1 shows eNB 112 and WLAN access point 116, providing a cellular interface and a WLAN interface, respectively, other embodiments may include other interfaces, that use different communication protocols, in addition to or instead of a cellular interface and/or a WLAN interface, such as a wireless personal area network (WPAN) interface, an Ethernet interface, and/or other wired or wireless interfaces which carry internet protocol (IP) traffic. The WPAN interface may use, for example, a Bluetooth protocol. Additionally, or alternatively, the network 100 may provide multiple interfaces of a same category, such as multiple cellular interfaces, WLAN interfaces, and/or WPAN interfaces. In some embodiments, interfaces may use different communication protocols (e.g., different generations/revisions of a cellular interface protocol, a WLAN protocol, and/or a WPAN protocol).

Figure 2:
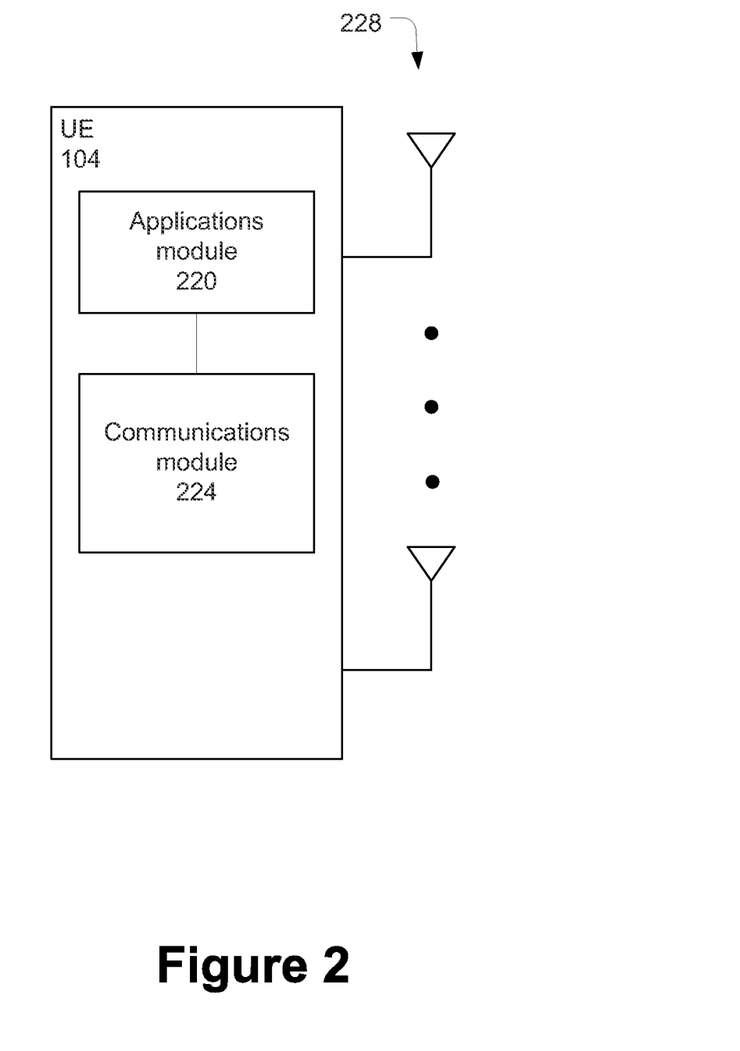
FIG. 2 is a block diagram illustrating a user equipment in accordance with various embodiments.

As shown in FIG. 2, the UE 104 may include an applications module 220 and a communications module 224 coupled to one another. The applications module 220 may run one or more applications on the UE 104, and may facilitate communications between the applications and the remote server 108. The applications may be stored on the UE 104 and/or accessed by the UE 104 from remote storage. The communications module may manage the communications of the applications over network 100. In some embodiments, the communications module may be included in the applications module. In other embodiments, the communications module may be included in a separate component from the applications module, such as a transceiver of the UE 104.

The applications module 220 and/or communications module 224 may be further coupled with one or more of a plurality of antennas 228 of the UE 104 for communicating wirelessly over network 100. The UE 104 may include any suitable number of antennas 228. One or more of the antennas 228 may be alternately used as transmit or receive antennas. Alternatively, or additionally, one or more of the antennas 228 may be dedicated receive antennas or dedicated transmit antennas.

In various embodiments, the applications module 220 may run an application and the application may request communications with the remote server 108. The communications may be connection-oriented or connectionless and may be referred to as a flow or a session associated with the application and/or the process being carried out by the application. In some embodiments, the connection may be a transmission control protocol (TCP) connection, and the server 108 may be a TCP server. Other embodiments may use the user datagram protocol (UDP), and the server 108 may be a UDP server. Additionally, or alternatively, other embodiments may use other Internet Protocol (IP) based transport protocols for the communications.

The applications module 220 may select a first interface to form the connection from interfaces that are available at the time of the connection request. The first interface may be selected based on a route table. The route table may be stored on and/or accessed by the applications module 220. The route table may include a plurality of rules that define preferences for one or more interfaces over other interfaces.

The applications module 220 and/or communications module 224 may monitor for the availability of other interfaces and/or monitor the quality of the first interface and/or other available interfaces. The applications module 220 and/or communications module 224 may identify a second interface that is preferred to the first interface. For example, the second interface may have recently become available (e.g., the UE 104 entered an area that is covered by a WLAN interface), the quality of the second interface may have improved since the first interface was chosen, and/or the quality of the first interface may have worsened since the first interface was chosen. The applications module 220 and/or communications module 224 may then modify the route table to prioritize the second interface over the first interface based on the dynamic quality of experience estimated for each available interface. In some embodiments, the mechanisms used for determining the priority of the interfaces may be derived in part or in whole from policies which either ship with and/or are subsequently delivered to the UE 104. The policies may include, but are not limited to, the types of metrics to evaluate, the types of hysteresis, and the values or thresholds against which the metrics are evaluated.

In some embodiments, the route table may be modified by creating one or more rules that take precedence over an existing rule to prioritize the second interface over the first interface. Thus, the existing rules in the route table may be left as they are. Accordingly, the created rule may be removed at a later time to revert back to the default setting of the route table. In some embodiments, the created rule may be associated with one or more applications, flows, and/or routes, as further discussed below. In other embodiments the priority of existing rules may be modified to influence the selection of interfaces on a per-flow basis.

In some embodiments, the creation and/or modification of entries in the route table will result in subsequent applications and their associated flows to initiate communications over the preferred interface. This mechanism ensures that new applications are initiated on the most optimal interface based on upon the dynamic conditions and quality of experience (QoE) metrics assessed on available interfaces at any time. In some embodiments, the preferred interface may be different for different applications and/or flows, as further discussed below.

In some embodiments, the ongoing flow may be migrated from the first interface to the second (e.g., more preferred) interface after evaluation of the available interfaces and corresponding changes to the route table are completed. The mechanism to trigger this migration may differ depending on the transport protocol used. For example, connectionless transports may redirect future packets over the preferred interface as indicated by the route table upon relevant changes to the route table rules. Connection-oriented transports, such as TCP, may require a reset operation to repeat the consultation of the route table to identify the preference for the second interface. The applications module 220 and/or communications module 224 may in this case execute such a reset operation. In the case of TCP, this operation is referred to as a TCP Reset. In some embodiments an instruction for the reset operation may be sent to the application and/or the remote server 108 to terminate an existing flow.

Many applications may seamlessly re-establish a flow upon receipt of a TCP reset operation instruction. For a connection-oriented flow (e.g., TCP flow), when a reset operation occurs, the application may terminate the existing flow and re-establish the logical flow between the UE 104 and remote server 108. While the re-established flow may appear as a new flow at the TCP layer, it will be referred to as a continuation of the same logical flow in that the application may resume the context and/or state of the flow. When this re-established flow is created, the applications module 220 may reference the route table to re-establish the logical flow with the remote server 108. This enables the second (preferred) interface to be utilized for the re-established flow. This procedure of re-establishing a flow in response to a reset operation is often used to respond to interface drops or failures. However, using the process described herein of modifying the route table to reflect the preferred interface for the given flow at a given time and the triggering of the reset operation on a per-application and/or per-flow basis, the reset capability of the application can be used to accomplish the unique behavior of migrating the flow from one interface to another (e.g., from the first interface to the second interface). In many cases, this results in a seamless end-user experience as the application moves from one interface to another. The state (e.g., of the ongoing flow) may be maintained during the migration by the application, thereby maintaining the end-user experience of application continuity.

In some embodiments, the UE 104 may also send a notice/instruction to the remote server 108 of the reset operation. In other embodiments, the remote server 108 may not be explicitly notified of the reset operation by the UE 104. Sending the reset operation to both the UE 104 and the remote server 108 may reduce the resources consumed at the remote server 108 which may otherwise remain allocated until the flow times out at the remote server 108. For some applications, there may be additional benefits associated with the proper reset operation to both sides of the flow in terms of improving the re-establishment of the logical flow.

Additionally, the applications module 220 may start new flows (e.g., for other applications and/or processes) on the second interface (e.g., based on the modified route table). In some embodiments, only new flows may be started on the second interface, and ongoing flows may not be migrated to the second interface. In these embodiments, the applications module 220 and/or communications module 224 may not initiate a reset operation at the UE 104 and/or remote server 108. The decision not to migrate a given flow may be based upon policies present on the UE 104 or downloaded to the UE 104. These policies may indicate a preference to migrate or not migrate specific flows based on conditions including but not limited to the application's poor experience during migration, the expected short duration of the flow, or a user or service provider preference to execute (or not execute) the flow on particular interfaces.

Alternatively, a subset of ongoing flows may be migrated to the second interface. In that case, the applications module 220 and/or communications module 224 may execute a reset operation for the subset of ongoing flows. Alternatively, a rule may be created in the route table that applies only to the subset of ongoing flows that are to be migrated. The applications module 220 and/or communications module 224 may determine whether to migrate ongoing flows and/or which ongoing flows to migrate based on any suitable factors, such as an estimated time remaining for the flow, the bandwidth of the flow, the identity of the application executing the flow, and/or other factors. For example, in some situations, a flow with a short time remaining may not be migrated to the second interface, and the flow may instead be finished on the first interface.

In some embodiments, the mechanism used to classify/prioritize a given flow by the applications module 220 and/or communications module 224 may be based upon policies present on and/or downloaded to the UE 104. These mechanisms and their representation within policies may be based on items including but not limited to the following: remote server 108 IP addresses or ranges; domain name system (DNS) names, patterns, or other mechanisms which identify a given remote server or set of servers; specific application names, fingerprints, attributes, patterns or other mechanisms which identify an application; and/or a default classification which matches all flows not identified more specifically by other classification mechanisms. The applications module 220 and/or communications module 224 may consult internal state or other resources to uniquely identify specific flows based upon the classifiers.

In some embodiments, the policies associated with a given flow may be inherited from the policies associated with the corresponding classifier which best matches the flow. The best matching classifier for a given flow may be determined by mechanisms including but not limited to a priority of the classifier, the order of the policies, priority of the policy provider, the specificity of the classifier, the current context of the device or its connections, and/or the type of classifier.

In various embodiments, the second interface may be identified as preferred to the first interface based on any number of metrics, such as connection status, availability of a valid internet protocol (IP) address, signal strength, signal to noise ratio (SNR), channel utilization, a detection of a backhaul outage, a detection of hotlining (e.g. firewall and/or redirection policies that prevent direct Internet access pending user interaction), cell loading, round-trip latency, throughput, application mean opinion score (MOS) (e.g., for voice-over-IP (VoIP)), economic considerations of the available interfaces (e.g., costs to the service provider and/or user), power consumption estimations and/or measurements of the available interfaces, velocity of movement of the UE 104, a power state of the UE 104 (e.g., remaining battery power and/or whether operating off of battery versus charging), IEEE 802.11U—and/or access network discovery and selection function (ANDSF)—asserted information about the available interfaces, prior performance on the same interface, user preferences, and/or service provider preferences (e.g., business/marketing considerations). The metrics and mechanisms to evaluate and prioritize interfaces may be hardcoded in the implementation and/or derived from policies present or downloaded to the UE 104 or preferences specified by the user.

The relative priority of available interfaces may be updated dynamically depending on changing conditions. Thus, a given interface may not always be prioritized over another interface (e.g., a WLAN interface may not always be prioritized over a cellular interface).

For example, the applications module 220 and/or communications module 224 may require the WLAN interface to meet a QoE threshold before the WLAN interface will be prioritized over the cellular interface and/or an ongoing flow will be migrated from the cellular interface to the WLAN interface. If the available WLAN interface meets the QoE threshold, then the WLAN interface may be prioritized over the cellular interface and/or the ongoing flow may be migrated to the WLAN interface. However, if the available WLAN interface does not meet the QoE threshold, then the cellular interface may be prioritized over the WLAN interface and/or the ongoing flow may remain on the cellular interface. This may facilitate maintaining a high QoE for the user of the UE 104. Similarly, if the QoE of a current interface drops below a QoE threshold, then an ongoing flow on the current interface may be migrated to another available interface. The QoE thresholds may be different depending on the interface type, flow, application, and/or for evaluating whether to migrate from a current interface or migrate to a destination interface. In some embodiments, the migration of a flow may be delayed a variable period of time in order to give the flow an opportunity to complete on the existing interface. The duration of such a delay may be based upon mechanisms including but not limited to policies defined for the flow and/or application, the duration the flow has been active, and/or the duration measured by the applications 220 module or communications module 224 for similar flows in the past on this UE 104 or another UE.

In one example, the user may be running an application connected with the remote server 108 via a cellular interface. The user may then enter an area covered by a WLAN interface that is hotlined. The communications module 224 may not modify the route table or migrate the connection to the WLAN interface due to the detection of the hotlining condition. However, if the hotlining condition is removed (e.g., by the user and/or an automated process), then the connection may be migrated from the cellular interface to the WLAN interface. In some embodiments, the route table may be modified in a manner to enable automated or manual interaction with a captive portal to remove the hotlining condition (e.g. accepting the terms and conditions of the WLAN network). In this case, a route rule may be created to prefer the hotlined WLAN interface for the application and/or flow interacting with the captive portal. At the same time, existing applications and/or flows may be kept on the cellular interface (e.g., the routes associated with the applications may not be modified and/or a reset operation may not be executed for the applications). This may provide a seamless user experience until such a time when the hotlining condition is removed.

The applications module 220 and/or communications module 224 may continually monitor the current and/or available interfaces and dynamically update the route table as conditions change (e.g., as the UE 104 moves around and/or the availability and/or quality of the interfaces changes). Additionally, the applications module and/or communications module 224 may trigger a reset operation for one or more ongoing applications after the route table is updated.

The applications module 220 and/or communications module 224 may continually and/or periodically monitor active flows and/or applications to optimize the manner in which route rules and/or reset operations are executed for currently active and/or future flows. Information collected may include but is not limited to the application name, the application manifest contents, an application fingerprint, data consumed, session duration, destination IP addresses, interfaces used, economic cost incurred, and/or power consumed or estimated.

As discussed above, the relative priority of the available interfaces may vary amongst various applications, flows, and/or routes. The relative priority may be determined by the applications module 220 and/or communications module 224 based on policies associated with the UE 104. In some embodiments, the policies may be provided by the network operator and/or service provider.

For example, one interface may be preferred for one flow and/or application while simultaneously a different interface may be preferred for another flow and/or application. For instance, a mobile network operator may provide policies which prefer the use of a cellular interface whenever available and offering a sufficient QoE for some applications, and prefer a WLAN interface whenever available and offering a sufficient QoE for other applications. Additionally, or alternatively, flows for some applications may be migrated to a WLAN interface from a cellular interface whenever a WLAN interface is available, while flows for other applications may require a certain QoE threshold to be met on the WLAN interface before migrating the flows from the cellular interface. Still other flows may exclusively be executed over a given interface associated with a communications protocol (such as cellular or WLAN) regardless of whether other interfaces are available.

Under conditions when more than one interface is available, there may be cases where the first interface is preferred by a first application and simultaneously the second interface is preferred for a second application. As an example, one or more policies may prefer the use of a cellular interface (e.g., if available and offering a sufficient QoE) for an application which is not metered or charged per byte transferred (e.g., VoIP), and may prefer a WLAN interface for an application which is metered or charged per byte transferred (e.g., streaming media over IP). Considerations influencing dissimilar application-specific, flow-specific, or service-specific interface preferences include but are not limited to different entities providing the service, cost associated with the services and/or the corresponding data consumed, manner in which the data consumed is metered for the given services, security requirements for the services, performance requirements for the services, expected duration of flows associated with the services, and whether the services are reachable only via specific interfaces (e.g. on-campus Enterprise services only available via a WLAN Intranet but not via Cellular Internet access).

Thus, in some embodiments, the policies used by the UE 104 to determine the relative priority of available interfaces may be associated with a subset of applications, flows, and/or routes. The route table may be modified by creating rules to achieve the determined priorities. The rules in the route table may include an interface that is preferred for particular destination IP addresses or ranges of IP addresses (e.g., the IP address of the remote server 108).

The applications may be identified and/or categorized by any suitable information, such as application name, pattern, and/or information from an application manifest. Alternatively, the relative priority may be associated with a specific route of the flow (e.g., based on a source IP address, destination IP address, subnet mask, and/or port identifier). The applications module 220 and/or communications module 224 may create a rule in the route table that is associated with one or more applications, flows, and/or routes. The route entries themselves may be explicitly tied to a destination IP address or a range of destination IP addresses. In some embodiments the destination IP addresses and/IP address ranges corresponding to created and/or modified route entries in the route table can be extracted from policies, from information about currently active flows, and/or from information about previously active flows on the applications module 220.

Additionally, or alternatively, the applications module and/or the communications module 224 may execute a reset operation for a subset of ongoing flows depending on the applications, routes, and/or other parameters associated with the flows. The applications module 220 and/or communications module 224 may also create default rules that apply to applications, flows, and/or routes that are not covered by a more specific rule that is not application-, flow-, or route-specific.

In various embodiments, the application executing the ongoing flow may support TCP re-connection to maintain application continuity when executing a TCP reset. Thus a state of the ongoing flow may be maintained when migrating the flow from the first interface to the second interface. However, the reroute and reset process described herein may also be used with applications that do not support TCP re-connection. For these applications, the flow (e.g., the download and/or streaming process) may stop when the migration is triggered by the TCP reset instruction from the applications module 220 and/or communications module 224. In some cases, the user may be required to perform an action, such as pressing a button, to resume the flow.

Additionally, while the reroute and reset process is described herein with respect to a connection-oriented (e.g., TCP) connection between the UE 104 and the remote server 108, the process may be used for connectionless flows, such as a UDP connection. For a UDP application, the applications module 220 and/or communications module 224 may modify the route table to prioritize the second interface over the first interface. The UDP application may continually reference the route table, and thus no reset operation may be required for the UDP application to migrate to the second interface and to achieve a similar benefit as described herein for the connection-oriented flow case.

Figure 3:
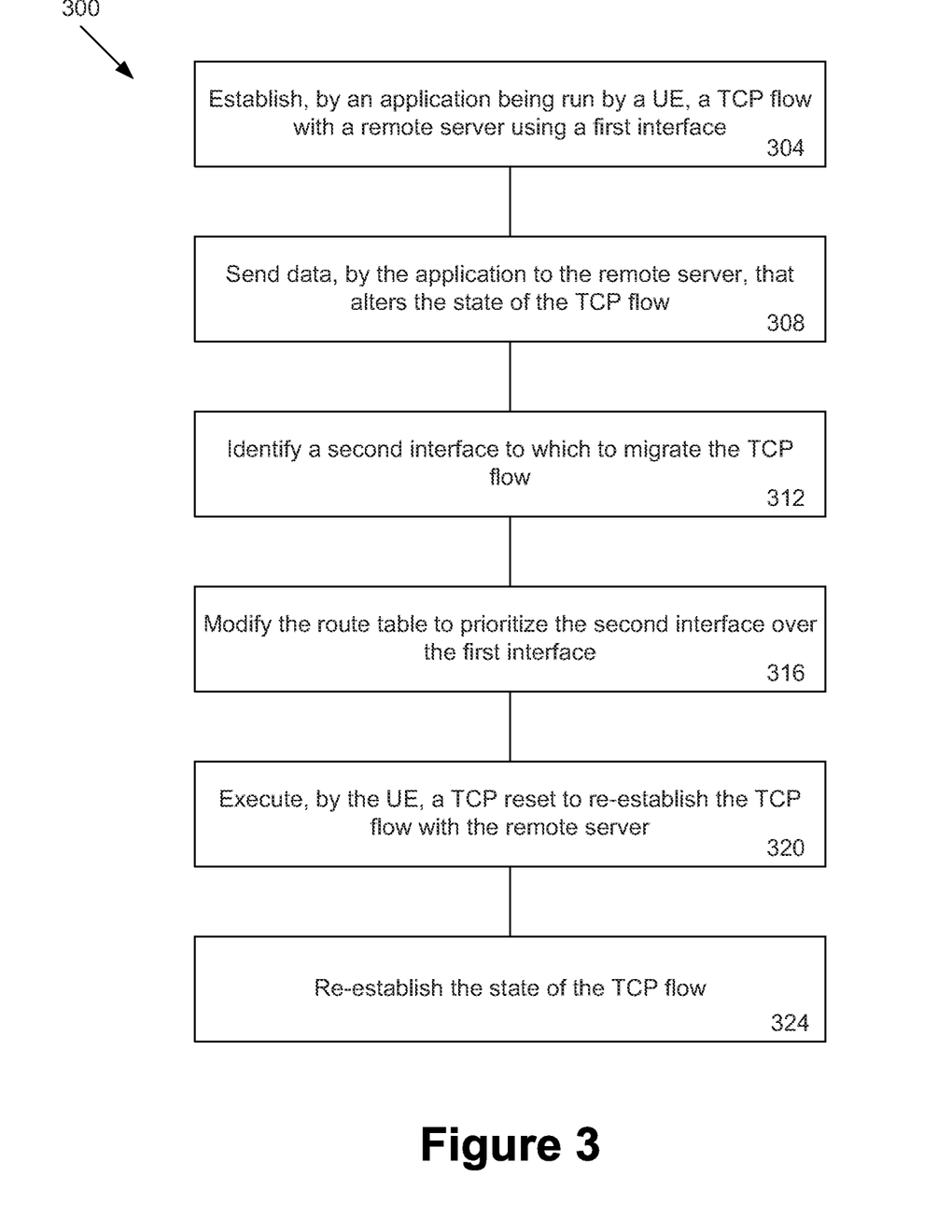
FIG. 3 is a flowchart illustrating a method of application continuity using reroute and reset that may be performed by a user equipment in accordance with various embodiments.

FIG. 3 illustrates a method 300 of maintaining application continuity using reroute and reset that may be performed by a UE (e.g., UE 104) in accordance with various embodiments. In some embodiments, the UE may include and/or have access to one or more computer-readable media having instructions, stored thereon, that, when executed, cause the UE to perform the method 300.

At 304, an application being run by the UE may establish a TCP flow with a remote server using a first interface. The first interface may be selected based on a route table.

At 308, the application may send data to the remote server that alters the state of the flow (e.g., in an application- and/or protocol-specific manner).

At 312, the UE may identify a second interface to which to migrate the TCP flow. The second interface may be identified as preferable to the first interface based on any suitable factors, as discussed herein. The second interface may have recently become available (e.g., may not have been available at block 304), the QoE of the second interface may have recently met a threshold value, the QoE of the first interface may have recently met a threshold value, and/or the relative QoE of the second interface relative to the first interface may have recently changed sufficiently to change their relative priority for the flow.

At 316, the UE may modify the route table to prioritize the second interface over the first interface. For example, the UE may create a rule that takes precedence over an existing rule to prioritize the second interface over the first interface. In some embodiments, the rule may be associated with the application and/or with the flow.

At 320, the UE may execute a TCP reset to re-establish the TCP flow between the application and the remote server. The TCP flow may be re-established using the second interface (e.g., chosen based on the created rule in the route table).

At 324, the application may re-establish the state of the TCP flow (e.g., in an application- and/or protocol-specific manner). The application and remote server may then continue their communications using the second interface. This re-establishment may be seamless or non-seamless from the UE 104 user point of view.

The first and second interfaces may be any suitable type of interfaces. For example, in some embodiments, the first interface may be a cellular interface and the second interface may be a WLAN interface. In other embodiments, the first interface may be a WLAN interface and the second interface may be a cellular interface. In yet other embodiments, both the first and second interfaces may be WLAN interfaces or cellular interfaces. While first and second interface are used throughout the document, an arbitrary number of changes to route rules and optional flow migrations may occur over the lifetime of a logical flow and/or application. In each case first interface is considered the currently active interface and second interface is the most preferred alternative interface.

Figure 4:
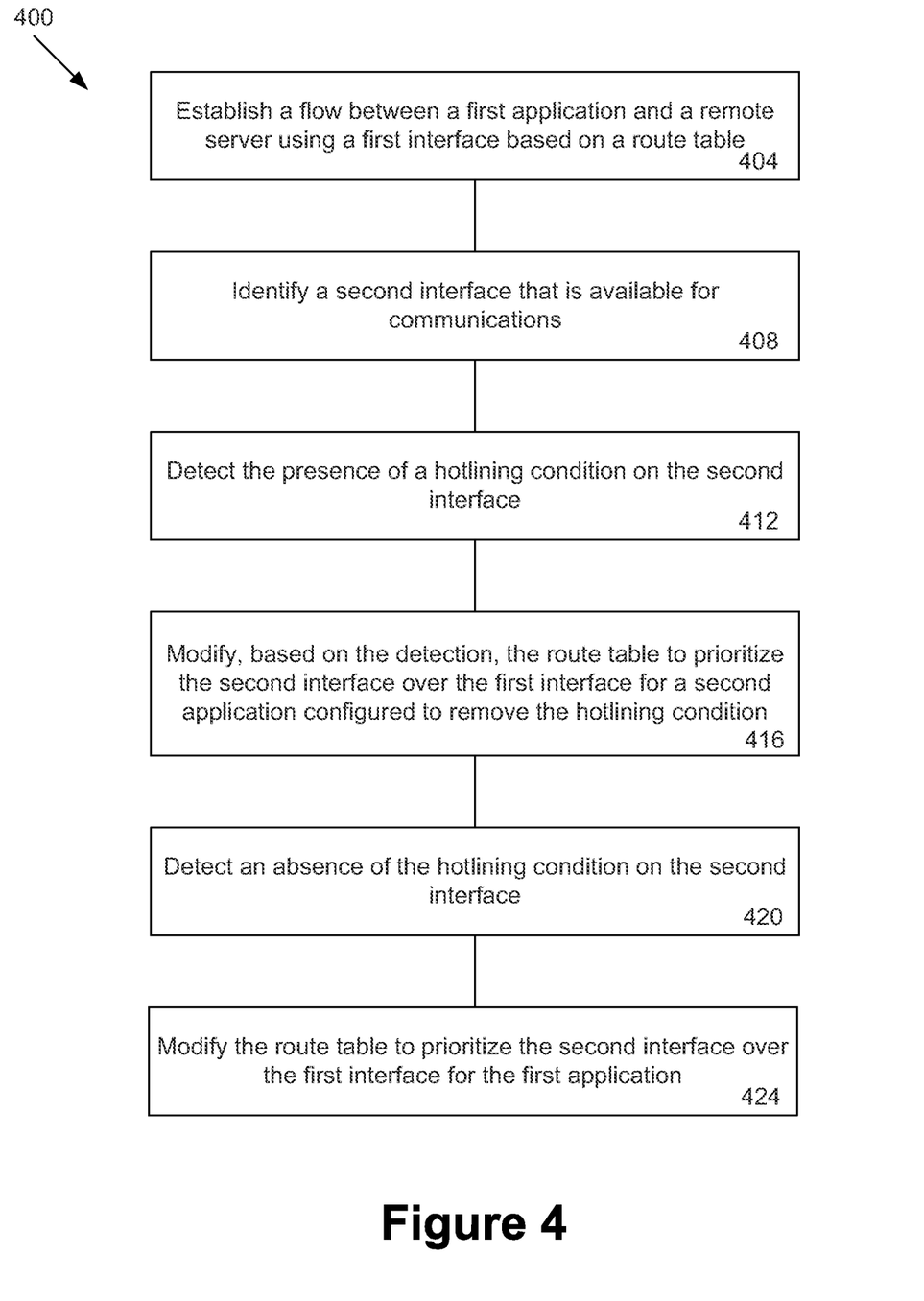
FIG. 4 is a flowchart illustrating a method of managing interface priority that may be performed by a user equipment in accordance with various embodiments.

FIG. 4 illustrates a method 400 of managing interface priority that may be performed by a UE (e.g., UE 104) in accordance with various embodiments. In some embodiments, the UE may include and/or have access to one or more computer-readable media having instructions, stored thereon, that, when executed, cause the UE to perform the method 400.

At 404, the UE may establish a flow between a first application and a remote server using a first interface. The first interface may be selected based on a route table.

At 408, the UE may identify a second interface that is available for communications with the UE At 412, the UE may detect the presence of a hotlining condition on the second interface.

At 416, the UE may modify, based on the detection of the hotlining condition, the route table to prioritize the second interface over the first interface for a second application that is configured to remove the hotlining condition. For example, the second application may interact (e.g., manually or automatically) with a captive portal associated with the second interface. The UE may maintain the flow between the first application and the remote server on the first interface while the hotlining condition is present on the second interface.

In some instances, the second application may remove the hotlining condition on the second interface. Thereafter, at 420, the UE may detect an absence of the hotlining condition on the second interface. At 424, the UE may modify the route table to prioritize the second interface over the first interface for the first application. In some embodiments, the UE may execute a reset operation to migrate the ongoing flow between the first application and the remote server from the first interface to the second interface.

Figure 5:
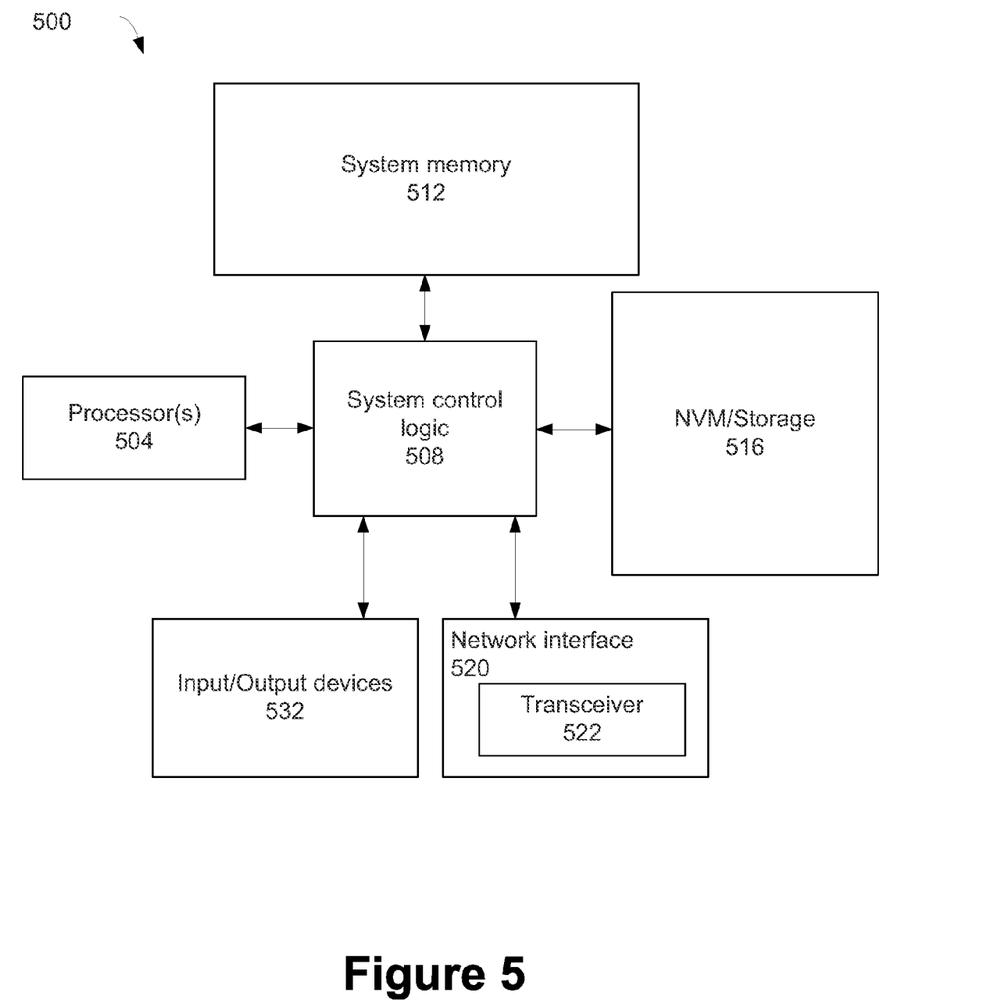
FIG. 5 is a block diagram illustrating an example computing system in accordance with various embodiments.

The UE 104 described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, a network interface 520 coupled with system control logic 508, and input/output (I/O) devices 532 coupled with system control logic 508.

The processor(s) 504 may include one or more single-core or multi-core processors. The processor(s) 504 may include any combination of general-purpose processors and dedicated processors (e.g., graphics processors, application processors, baseband processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD (s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520 and/or over Input/Output (I/O) devices 532.

Network interface 520 may have a transceiver 522 to provide a radio interface for system 500 to communicate over one or more network(s) and/or with any other suitable device. In some embodiments, the transceiver 522 may implement communications module 224 of UE 104. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a wired network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

In various embodiments, the I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory computer-readable media having instructions, stored thereon, that, when executed cause a computing system user equipment (UE) to:
    select a first wireless communication interface, based on a route table, for an Internet Protocol (IP)-based flow with a remote server to be used by an application, run by the UE, for communications with the remote server;
    establish the flow with the remote server using the first wireless communication interface;
    identify a second wireless communication interface to which to migrate the flow;
    modify the route table to prioritize the second wireless communication interface over the first wireless communication interface; and
    instruct, after the route table is modified, the application to execute a Transmission Control Protocol (TCP) reset operation to re-establish the flow with the remote server, based on the route table, using the second wireless communication interface;
    wherein the first wireless communication interface is a wireless local area network (WLAN) interface or a cellular interface; and
    wherein the second wireless communication interface is the WLAN interface or the cellular interface, and is different from the first wireless communication interface.

2. The one or more computer-readable media of claim 1, wherein the second wireless communication interface is identified based on signal measurements on a plurality of available interfaces including the first and second wireless communication interfaces, an estimation or a measurement of power consumption for communications on the available interfaces, economic considerations associated with the available interfaces, loading conditions associated with the available interfaces, or performance measurements on the available interfaces.

3. The one or more computer-readable media of claim 1, wherein the second wireless communication interface is identified based on an availability of a valid IP address or a detection of hotlining or a backhaul outage on one or more of a plurality of available interfaces including the first and second wireless communication interfaces.

4. The one or more computer-readable media of claim 1, wherein the instructions, when executed, cause the computing system to instruct a subset of applications run by the computing system to execute respective reset operations to re-establish respective flows using the second wireless communication interface.

5. The one or more computer-readable media of claim 1, wherein the first wireless communication interface is the cellular interface and the second wireless communication interface is (the WLAN) interface.

6. The one or more computer-readable media of claim 1, wherein the first wireless communication interface is (the WLAN) interface and the second wireless communication interface is the cellular interface.

7. The one or more computer-readable media of claim 1, wherein the route table is modified by creating a rule that takes precedence over an existing rule in the route table.

8. The one or more computer-readable media of claim 7, wherein the route table is modified to prioritize the second wireless communication interface over the first interface for a subset of applications run by the UE.

9. An apparatus, comprising:
applications circuitry to run an application and to facilitate communications between the application and a remote server via a first wireless communication interface, the first wireless communication interface selected based on a route table; and
communications circuitry coupled with the applications circuitry, the communications circuitry to:
identify a second wireless communication interface for communications between the application and the remote server;
modify the route table to prioritize the second wireless communication interface over the first wireless communication interface; and
instruct, after the route table is modified, the applications module to execute a Transmission Control Protocol (TCP) reset for the application;
wherein the applications circuitry is further configured to execute the TCP reset operation, based on the instruction, to re-establish communications between the application and the remote server using the second wireless communication interface based on the route table;
wherein the first wireless communication interface is a wireless local area network (WLAN) interface or a cellular interface; and
wherein the second wireless communication interface is the WLAN interface or the cellular interface, and is different from the first wireless communication interface.

10. The apparatus of claim 9, wherein the applications circuitry is to execute the reset operation after a delay from the identification of the second wireless communication interface to allow a flow between the application and the remote server to finish.

11. The apparatus of claim 9, wherein the communications circuitry is to instruct the applications circuitry to execute TCP reset operations for a subset of ongoing flows.

12. The apparatus of claim 9, wherein the communications circuitry is to identify the second wireless communication interface based on signal measurements on a plurality of available interfaces including the first and second wireless communication interfaces, an estimation or a measurement of power consumption for communications on the available interfaces, economic considerations associated with the available interfaces, loading conditions associated with the available interfaces, or performance measurements on the available interfaces.

13. The apparatus of claim 9, wherein the communications circuitry is to select the second interface based on an availability of a valid Internet Protocol (IP) address or a detection of hotlining or a backhaul outage on one or more of a plurality of available interfaces including the first and second wireless communication interfaces.

14. The apparatus of claim 9, wherein the first wireless communication interface is the cellular interface and the second interface is (the WLAN) interface.

15. The apparatus of claim 9, wherein the first wireless communication interface is (the WLAN) interface and the second wireless communication interface is the cellular interface.

16. The apparatus of claim 9, wherein the route table is modified by creating a rule that takes precedence over an existing rule in the route table.

17. The apparatus of claim 9, wherein the route table is modified to prioritize the second wireless communication interface over the first wireless communication interface for a subset of applications run by the applications circuitry.

18. The apparatus of claim 9, wherein the communications circuitry is to identify the second wireless communication interface based on a policy, wherein the policy is associated with a flow between the application and the remote server based on an internet protocol (IP) address, a domain name system (DNS) name, or a pattern of the remote server, a name, fingerprint, attribute, or pattern of the application or flow, or a default classification which matches flows not identified by other classifications.

19. The apparatus of claim 9, wherein the applications circuitry is to establish a new flow with the remote server on the second wireless communication interface based on the modified route table.

20. A system comprising:
an applications processor to run a plurality of applications including a first application, the applications processor configured to establish a flow between the first application and a remote server using a first wireless communication interface based on a route table; and
a communications processor coupled with the applications processor, the communications processor to:
identify a second wireless communication interface that is available for communications with the UE, wherein the second wireless communication interface is different from the first wireless communication interface and wherein the first and second wireless communication interfaces are physical layer interfaces;
detect a hotlining condition on the second wireless communication interface, wherein the hotlining condition requires interaction with a captive portal to allow communication with the remote server over the second wireless communication interface; and
modify, based on the detection, the route table to prioritize the second wireless communication interface over the first wireless communication interface for a second application that is configured to interact with the captive portal to remove the hotlining condition;
wherein the applications processor is further configured to maintain the flow between the first application and the remote server on the first wireless communication interface when the hotlining condition is present on the second wireless communication interface.

21. The system of claim 20, wherein after the detection of the hotlining condition, the communications process is further configured to:
detect an absence of the hotlining condition on the second wireless communication interface; and
modify the route table to prioritize the second wireless communication interface over the first wireless communication interface for the flow between the first application and the remote server.

22. The system of claim 21, wherein the applications processor is further configured to execute a reset operation to re-establish the flow between the first application and the remote server using the second wireless communication interface.

23. The system of claim 20, wherein the route table is modified by creating a rule that takes precedence over an existing rule in the route table.

24. The system of claim 20, wherein the first wireless communication interface is a cellular interface and the second wireless communication interface is a wireless local area network (WLAN) interface.

25. The system of claim 20, wherein the remote server is an Internet Protocol (IP)-based server.

26. The system of claim 20, wherein the system comprises a user equipment (UE) configured to communicate over the first and second wireless communication interfaces.

* * * * *